ELECTRON BEAM DEFLECTION CIRCUIT

Filed Nov. 16, 1964 2 Sheets-Sheet 1

INVENTORS
GUSTAVE L. GRUNDMANN &
JOSEPH J. SERAFINI
BY Eugene M. Whitacre
Attorney INVENTORS
GUSTAVE L. GRUNDMANN &
JOSEPH J. SERAFINI
BY Eugene M. Whitacre
Attorney United States Patent Office 3,365,608

Patented Jan. 23, 1968

3,365,608

ELECTRON BEAM DEFLECTION CIRCUIT

Gustave Louis Grundmann and Joseph James Serafini, Indianapolis, Ind., assignors to Radio Corporation of America, a corporation of Delaware Filed Nov. 16, 1964, Ser. No. 411,194
12 Claims. (Cl. 315—27)

Figure 1:
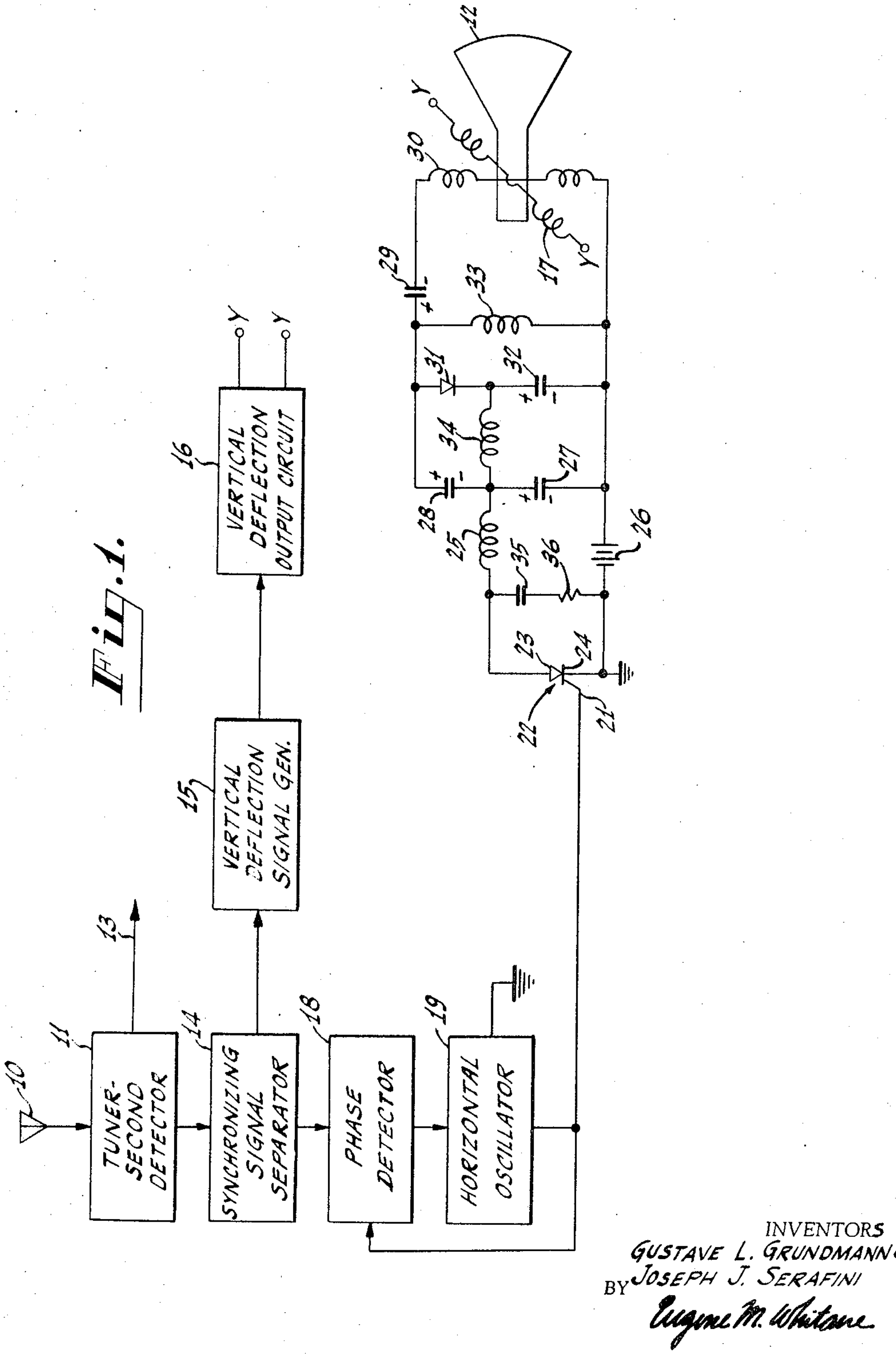

This invention relates to electron beam deflection circuits and, in particular, to a deflection circuit wherein the transfer of energy to a deflection winding is effected during retrace by means of a solid state semiconductor device such as a silicon controlled rectifier.

The invention is particularly useful in connection with horizontal deflection circuits for television receivers and will be described further in connection with use in such apparatus.

Numerous circuit designs for completely transistorized television receivers either have been constructed or have been described in detail in various technical publications. One of the most troublesome areas in such transistor receivers, from the point of view of reliability and economy, lies in the horizontal deflection circuits.

The high voltages and high currents encountered in such deflection circuits generally require the use of power switching transistors. The turn-off time of most power switching transistors is of such duration that a considerable and undesirable amount of power may be dissipated in the transistor during the switching interval. Power switching transistors having relatively short turn-off times are available but such high speed switching devices are relatively costly and therefore undesirable for most television receiver designs.

It is an object of the present invention, therefore, to provide a deflection circuit for television receivers utilizing reliable, high speed solid state switching devices which provide a cost saving over power switching transistors.

It is a further object of the present invention to provide a horizontal deflection circuit for television receivers utilizing a relatively inexpensive solid state switching device capable of withstanding high voltages and high currents.

In accordance with the present invention, an electron beam deflection circuit for use in a television receiver comprises a deflection winding and means for coupling the winding across a substantially constant potential supply during the trace portion of an electron beam deflection cycle. A pair of series-connected energy storage capacitors, coupled across the deflection winding, supply energy to the deflection winding during the retrace portion of the cycle. Retrace is initiated by means of a solid state controlled rectifier which is coupled across one of the energy storage capacitors. The controlled rectifier is triggered to a state of conduction at the beginning of the retrace portion of the cycle and continues conducting throughout the retrace portion. Advantageously, the rectifier further continues to conduct for a portion of the trace period of the cycle. The controlled rectifier is turned off (returned to a "forward blocking state") by means of a reverse current supplied to the rectifier by the energy storage capacitors.

In accordance with the invention, a low power dissipating, reliable deflection circuit utilizing solid state devices is provided.

Figure 2:
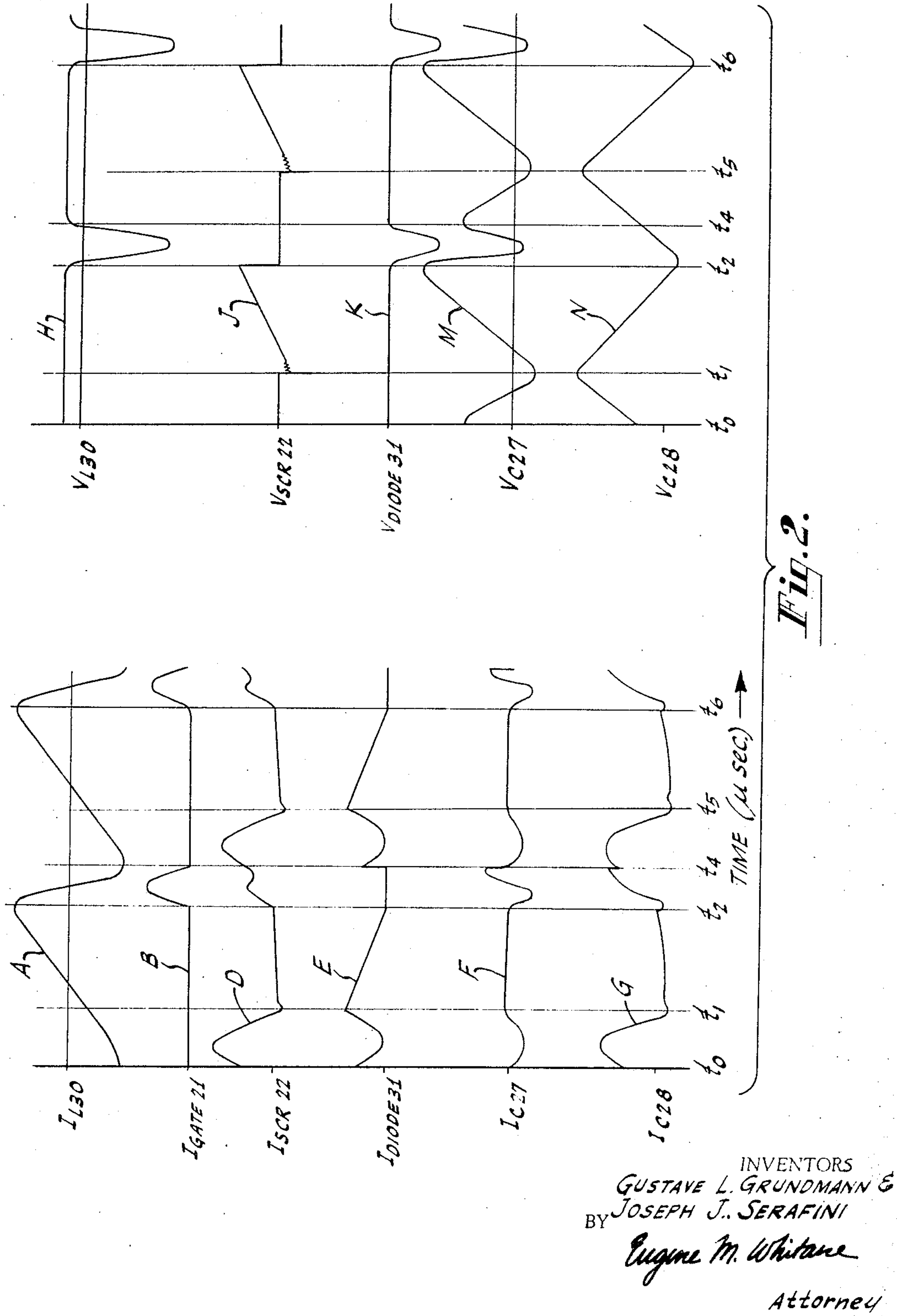

The novel features that are considered characteristic of this invention are set forth with particularity in the appended claims. The invention, itself, however, both as to its organization and method of operation, as well as additional objects and advantages thereof, will best be understood from the following description when read in connection with the accompanying drawing, in which:

FIGURE 1 is a schematic circuit diagram, partially in block diagram form, of a television receiver embodying the invention; and FIGURE 2 is a series of wave form diagrams (not drawn to scale) to which reference will be made in the explanation of the operation of the circuit of FIGURE 1.

Referring now to FIGURE 1 of the drawing, an embodiment of the invention will be described as it may be used in a typical television receiver. The television receiver includes an antenna 10 which receives composite television signals and couples the received signals to a tuner-second detector 11. The tuner-second detector 11 normally includes a radio frequency amplifier, a frequency converter for converting the radio frequency signals to intermediate frequency signals, an intermediate frequency amplifier, a detector for deriving composite television signals from the intermediate frequency signals, and a video amplifier. The amplified composite television signal produced by the video amplifier is applied to the control electrode (not shown) of a television kinescope 12 by means including an output lead 13. The composite television signal is also applied from tuner-second detector 11 to a synchronizing signal separator circuit 14. The sync separator circuit 14 supplies vertical synchronizing pulses to a vertical deflection signal generator 15. Vertical deflection signal generator 15 is connected to a vertical deflection output circuit 16, terminals Y—Y of which are connected to a deflection yoke winding 17 of kinescope 12.

Horizontal synchronizing pulses are derived from sync separator circuit 14 and are supplied to a phase detector 18, the latter also being supplied with the signal generator by a horizontal oscillator 19. An error voltage is developed in phase detector 18 and applied to horizontal oscillator 19 to synchronize the output of the latter with the horizontal synchronizing pulses. The signal developed by horizontal oscillator 19 is applied to the gate electrode 21 of a solid state controlled rectifier such as a silicon controlled rectifier 22. Silicon controlled rectifier 22 further comprises an anode electrode 23 and a cathode electrode 24. Cathode 24 is coupled to a reference potential such as ground while anode 23 is coupled to a relatively small inductor 25. A low voltage D-C supply 26 is coupled in series with a first energy storage capacitor 27 across the series combination of inductor 25 and silicon controlled rectifier 22. A second energy storage capacitor 28, one terminal of which is coupled to the junction of inductor 25 and capacitor 27, is coupled in series with capacitor 27, the series combination of capacitors 27 and 28 being connected, in turn, across the series combination of a D-C blocking capacitor 29 and a horizontal deflection winding 30. A diode 31 and a relatively large boost capacitor 32 are also coupled in series across the combination of capacitor 29 and winding 30. A relatively large inductor 33 is coupled across the series combination of diode 31 and boost capacitor 32 to provide a direct current path for the diode. Similarly, a relatively large inductor 34 is coupled between the junction of diode 31 and boost capacitor 32 and the junction of capacitors 27 and 28 to provide a path for charging current from capacitor 32 to capacitors 27 and 28. A pulse suppressing circuit consisting of capacitor 35 and a resistor 36 is coupled between anode 23 and cathode 24 of rectifier 22.

In operation, a television signal at radio frequency is received by antenna 10. The received signal is amplified and demodulated and the demodulated signal is then amplified, all operations being performed by tuner-second detector 11. The demodulated television signal appearing at output lead 13 is then applied to the control grid of kinescope 12. The demodulated television signal also is applied to synchronizing signal separator circuit 14. Sync separator circuit 14 separates the deflection synchronizing signals from the composite television signal and supplies vertical synchronizing signals to vertical deflection signal generator 15 and horizontal synchronizing signals to phase detector 18. Output pulses generated by vertical deflection signal generator 15 are supplied to vertical deflection output circuit 16 which, in turn, supplies a suitable sawtooth of current at field frequency to the vertical deflection winding 17 coupled across terminals Y—Y.

The signal generated by horizontal oscillator 19 (at a nominal frequency of 15,750 cycles per second) is applied to phase detector 18. The applied signal is compared in phase detector 18 with the horizontal synchronizing pulses supplied to phase detector 18 from sync separator circuit 14. Phase detector 18 develops an error voltage which, in turn, is applied to horizontal oscillator 19 to control the oscillator phase and frequency.

The horizontal output pulses produced by oscillator 19 are shaped so as to provide positive pulses having, for example, a width of 10 microseconds and a repetition rate of 15,750 cycles per second.

The positive pulses so formed are coupled to gate electrode 21 of silicon controlled rectifier 22. The silicon controlled rectifier 22, as will be described more fully below, initiates the retrace portion of the horizontal deflection cycle each time such a pulse is applied to gate electrode 21.

Referring to FIGURE 2, current and voltage waveforms at various points in the circuit of FIGURE 1 are shown for two complete deflection cycles. The trace portion of the first full deflection cycle is indicated as occurring during the time interval $t_0$–$t_2$ while the retract portion of the cycle occurs during the interval $t_2$–$t_4$. Typically, the interval $t_0$–$t_2$ is about 53 microseconds in duration while the interval $t_2$–$t_4$ is about 10.5 microseconds in duration.

In referring to the waveforms shown in FIGURE 2, the polarities of potentials and the directions of current flow are defined with reference to the polarity markings shown on the circuit components in FIGURE 1. Currents are defined as positive when flowing from positive to negative potential through a given component.

A short time after initial application of power to the television receiver (e.g., of the order of seconds), a substantially constant potential is developed across capacitor 32, the polarity of the potential being indicated in FIGURE 1. Capacitor 32 is maintained at this potential, as will be pointed out below, principally by means of current supplied during each deflection cycle form deflection winding 30 and inductor 33. The potential developed across capacitor 32 is greater than that of D-C supply 26 and typically reaches a value within the range of one and one-half to two times the value of the D-C supply. Capacitor 32, in conjunction with diode 31, acts as a substantially constant potential supply which is coupled across deflection winding 30 during the trace portion of the deflection cycle.

The waveform A of FIGURE 2 indicates the current flowing through winding 30 changes in a substantially linear manner throughout the trace interval ($t_0$–$t_2$). As is shown in the drawing, the current through deflection winding 30 at the beginning of the trace interval flows in a first direction and decreases linearly, then passes through zero, and thereafter increases linearly but flows in the opposite direction. According to the sign convention adopted herein the current through winding 30 is negative at the beginning of trace and positive at the end thereof.

During the retrace interval ($t_2$–$t_4$), the current in deflection winding 30 is returned in a substantially sinusoidal manner to the original value which it had reached at the start of the previous trace interval. Ideally, the negative and positive peak values of current flowing in winding 30 are substantially equal and are selected for a given application according to the energy required to deflect a given electrode beam across the phosphor-coated screen of the particular associated kinescope 12. The illustrated deflection current waveform is produced in the following manner.

Specifically, considering an entire deflection cycle, immediately prior to initiation of the retrace portion of the deflection cycle (i.e., immediately prior to time $t_2$), the algebraic sum of the potentials across capacitors 27 and 28 (waveforms M and N) is slightly greater than the constant potential across capacitor 32. Hence diode 31 is biased for forward conduction and a substantially constant potential (see trace portion of waveform H) is coupled, by means of capacitor 29, to deflection winding 30. At time $t_2$, a positive current pulse (waveform B), representative of the horizontal synchronizing signal, is supplied from oscillator 19 to gate electrode 21 of silicon controlled rectifier 22. Rectifier 22 is switched to its high conduction (low impedance) state causing capacitor 27 to begin to discharge in a substantially sinusoidal manner through the relatively short time constant resonant circuit which includes, principally, inductor 25 and rectifier 22. The rapid drop in potential across capacitor 27 is coupled to diode 31 by means of capacitor 28. Diode 31 becomes reverse biased and opens, removing the constant potential from deflection winding 30. The discharge of capacitor 27 and the resultant opening of diode 31 creates a disturbance in the resonant circuit comprising capacitors 27 and 28, inductors 25 and 33 and winding 30. The potential across and current through winding 30 therefore undergo a portion of a cycle of substantially sinusoidal oscillation (see waveforms A and H). The period of the last-mentioned resonant circuit is adjusted, for example, to twice the retrace interval.

At time $t_4$ (or time $t_1$) which is the end of the retrace interval, the capacitors 27 and 28 have attained charges such that the algebraic sum of the potentials across such capacitors (and therefore the potential across winding 30) is of such a polarity and magnitude as to forward bias diode 31. The current through deflection winding 30, under the influence of the substantially constant potential supplied by capacitor 32 and diode 31, returns to the linear trace waveform. During the first portion of the trace interval a component of yoke current flows through the forward biased diode 31 to charge the capacitor 32. A second component of the yoke current charges capacitor 28 via inductor 25 and silicon controlled rectifier 22. This last-mentioned charging current diminishes the current flowing from deflection winding 30 through diode 31 (see waveforms E and G between, i.e., time $t_5$ and time $t_6$). During this same interval, current also flows from potential source 26 to capacitor 27 via rectifier 22 (see waveform F) such that the potentials across capacitors 27 and 28 vary in opposite senses. As the current supplied to capacitor 28 decreases towards zero, an increasing proportion of the deflection winding current flows through diode 31. At time $t_5$, as will be explained more fully below, silicon controlled rectifier 22 is switched to a high impedance ("off") state and substantially all of the deflection winding current flows through diode 31. Throughout the above-described segment of the trace portion of a deflection cycle, the potentials across capacitors 27 and 28 are such that diode 31 is maintained in a state of forward conduction and a substantially constant potential is applied to deflection winding 30.

After the current in deflection winding 30 passes through zero (waveform A), capacitor 28 supplies a relatively small current via diode 31 to capacitor 32 while capacitor 27 is charged from capacitor 32 via inductor 34. The algebraic sum of the potentials across capacitors 27 and 28 therefore remains substantially fixed and maintains diode 31 in a state of forward conduction throughout the remainder of the trace portion of the cycle. A constant potential is therefore applied across deflection winding 30 throughout the entire trace portion of a deflection cycle.

As is shown in waveform D, silicon controlled rectifier 22 continues to conduct in the forward direction at the end of retrace and, in fact, continues to conduct during a portion of the trace interval (i.e., from time $t_4$ to time $t_5$ or from time $t_0$ to time $t_1$). The resonant periods of a first circuit comprising inductor 25, capacitor 28 and winding 30 and a second circuit comprising inductor 25 and capacitor 27 are proportioned with respect to the duration of the retrace interval such that the sum of the currents from capacitors 27 and 28 flowing through rectifier 22 is positive at the end of retrace. Capacitor 32 and inductor 34, because of their relatively large values, may be neglected in the following analysis of the circuit during the trace interval.

With both diode 31 and rectifier 22 in the state of forward conduction, capacitors 27 and 28 effectively are coupled in parallel one with the other, the parallel combination being coupled across the series combination of rectifier 22 and inductor 25. The oscillation period of the series resonant circuit comprising the combination of inductor 25 and capacitors 27 and 28 determines the duration of conduction of rectifier 22 during the trace portion of the deflection cycle. The resonant circuit provides means for extinguishing the flow of current through rectifier 22 in the following manner. At time $t_0$, as diode 31 is switched "on," a new sinusoidal oscillation commences in the circuit comprising inductor 25, capacitor 27, capacitor 28 and rectifier 22 (see waveform D— current through rectifier 22). It should be noted that during the trace interval the current flowing through rectifier 22 is made up of the sum of the currents from capacitors 27 and 28. As is shown in waveform D, the current through rectifier 22 initially increases, then decreases, passing through zero. The current then begins to increase slightly in the negative sense. However, the flow of negative current through rectifier 22 (i.e., from cathode to anode) serves to switch rectifier 22 "off" (i.e., into a high impedance state). The rapid switching of rectifier 22 tends to produce a ringing between the circuit inductance (e.g., inductor 25) and the relatively small inter-electrode capacitance of rectifier 22 (see pulse at time $t_1$ in waveform J). Resistor 36 and capacitor 35 serve to damp the ringing such that the negative current flowing through rectifier 22 decreases exponentially towards zero.

It should be noted that the capacitances of capacitors 27 and 28 are selected in a ratio one with respect to the other and with respect to other parameters of the circuit so that the sum of the resultant voltages across such capacitors (1) maintains the diode 31 conductive during the trace interval; and (2) drops to a low enough value during the retrace interval so that the diode 31 may be cut off.

Furthermore, such components are selected so that silicon controlled rectifier 22 is maintained in a state of forward conduction throughout a part of the trace portion of a deflection cycle so as to permit a reduction in the peak current handling capabilities of rectifier 22 (i.e., to permit flow of charging current over a period of time greater than retrace). Capacitor 29 is selected, where desirable, so as to provide "S-shaping" of the deflection current waveform.

A circuit of the type shown in FIGURE 1 has been built and tested utilizing the following components.

| | |
|---|---|
| Silicon controlled rectifier 22 | G. E. type C40D. |
| Inductor 25 | 210 microhenries. |
| D-C supply 26 | 18 volts. |
| Capacitors 27 and 28 | 0.022 and 0.068 microfarads. |
| Capacitors 29 and 32 | 8 and 6 microfarads, respectively. |
| Horizontal deflection winding 30 | 750 microhenries. |
| Diode 31 | Type 1N2364B. |
| Inductors 33 and 34 | 4 millihenries. |
| Capacitor 35 | 470 micro-micro-farads. |
| Resistor 36 | 1000 ohms. |

What is claimed is:

1. In a television receiving circuit, an electron beam deflection circuit comprising:
   a beam deflection winding,
   means coupled in parallel with said deflection winding for applying thereto a substantially constant potential during the trace portion of a beam deflection cycle,
   first and second means for electrostatically storing energy coupled in series combination, said series combination being coupled in parallel with said deflection winding,
   and gating signal responsive conducting means coupled in circuit with at least one of said energy storage means for initiating the discharge of said energy storage means upon application of a gating signal to said conducting means.

2. In a television receiving circuit, an electron beam deflection circuit comprising:
   a beam deflection winding,
   unidirectional conducting means,
   means for supplying a substantially constant electric potential coupled in series combination with said unidirectional conducting means, said series combination being coupled in parallel with said deflection winding, said deflection circuit further comprising
   first and second electrostatic energy storage means coupled in series combination, said last-named series combination being coupled in parallel with said deflection winding,
   and gating signal responsive conducting means coupled in circuit with at least one of said energy storage means for initiating discharge of said energy storage means upon application of a gating signal to said signal responsive conducting means.

3. In a television receiving circuit, an electron beam deflection circuit comprising:
   a beam deflection winding,
   a diode,
   means coupled in series with said diode for applying a substantially constant potential to said beam deflection winding during the trace portion of a beam deflection cycle,
   first and second energy storage capacitors coupled in series combination, said series capacitor combination being coupled in parallel with said deflection winding, said deflection circuit further comprising
   a charging inductor coupled between said constant potential means and the junction of said first and second capacitors, and
   gating signal responsive rectifier means coupled in circuit with at least one of said energy storage capacitors for initiating discharge of said energy storage capacitors upon application of a retrace gating signal to said rectifier means.

4. In a television receiving circuit, an electron beam deflection circuit comprising:
   a beam deflection winding,
   means coupled in parallel with said deflection winding for applying thereto a substantially constant potential during the trace portion of a beam deflection cycle,
   a first capacitor and a first inductor coupled in series combination across said potential applying means,
   a second capacitor having a first terminal coupled to the junction of said first capacitor and said first inductor and having a second terminal coupled to said deflection windings, and
   gating signal responsive conducting means coupled across said first capacitor for initiating discharge of energy stored in said first capacitor upon application of a gating signal to said signal responsive conducting means.

5. In a television receiving circuit, an electron beam deflection circuit comprising:
  a beam deflection winding,
  a unidirectional conducting device,
  means coupled in series with said unidirectional device for applying a substantially constant potential to said beam deflection winding during the trace portion of a beam deflection cycle,
  a first capacitor and a first inductor coupled in series combination across said potential applying means,
  a second capacitor having a first terminal coupled to the junction of said first capacitor and said first inductor and having a second terminal coupled to said deflection winding,
  and gating signal responsive rectifier means coupled across said first capacitor for discharging the energy stored in said first capacitor upon application of a retrace initiating signal to said sgnal responsve rectifier means.

6. In a television receiving circuit, an electron beam deflection circuit comprising:
  a beam deflection winding,
  means for supplying an electric potential,
  a diode coupled between said winding and said supply means and poled to apply a substantially constant potential to said winding whenever the potential across said winding reaches a limiting value of predetermined polarity, said deflection circuit further comprising
  a first capacitor and a first inductor coupled in series combination across said supply means,
  a second capacitor coupled from the junction of said first capacitor and said first inductor to the end of said deflection winding which is coupled to said diode, said deflection circuit further comprising
  a solid state controlled rectifier coupled in series combination with a second inductor, the last-named series combination being coupled across said first capacitor, said controlled rectifier including a gate terminal and being responsive to gating signals applied thereto to initiate discharge of said first and second capacitors through said second inductor and thereby to initiate the retrace portion of the deflection cycle.

7. An electron beam deflection circuit comprising:
  a beam deflection winding,
  means including a diode coupled in parallel with said deflection winding for applying thereto a substantially constant potential during the trace interval of a beam deflection cycle,
  first and second capacitors for storing electrostatic energy coupled in series combination, said series combination being coupled in parallel with said deflection winding,
  a first inductor coupled from the junction of said capacitors to said potential applying means for charging said capacitors during the trace interval,
  a solid state controlled rectifier coupled in series combination with a second inductor, the last-named series combination being coupled across said first capacitor to initiate discharge of said first and second capacitors through said second inductor and thereby initiate the retrace portion of the deflection cycle upon application of a gating signal to said controlled rectifier.

8. An electron beam deflection circuit according to claim 7 wherein the resonant period of a first circuit comprising said first capacitor and said second inductor is less than the resonant period of a second circuit comprising said second capacitor, said second inductor and said deflection winding whereby upon application of a gating signal to said controlled rectifier said first capacitor discharges more rapidly than said second capacitor causing a reverse bias potential to be applied to said diode and thereby initiating the retrace portion of the deflection cycle.

9. A deflection circuit according to claim 8 wherein the resonant periods of said first and second circuits are proportioned with respect to the duration of the retrace interval such that a positive current flow exists through said controlled rectifier at the termination of such retrace interval.

10. A deflection circuit according to claim 9 wherein the resonant period of said first circuit is greater than the retrace interval but not greater than twice such retrace interval and the period of said second circuit is not less than twice the retrace interval.

11. A retrace driven deflection circuit comprising:
  first, second and third circuit branches coupled in parallel,
  said first branch comprising a deflection winding,
  said second branch comprising the series combination of a diode and a substantially constant potential supply,
  said third branch comprising the series combination of first and second capacitors,
  said deflection circuit further comprising the series combination of a solid state controlled rectifier and an inductor coupled in circuit with said first capacitor, said rectifier being responsive to signals applied thereto to initiate discharge of said first and second capacitors and thereby initiate the retrace portion of a deflection cycle,
  the resonant periods of a second resonant circuit comprising said inductor, said second capacitor and said deflection winding and a first resonant circuit comprising said inductor and said first capacitor being proportioned with respect to the duration of the retrace interval such that a forward current flows through said rectifier at the termination of the retrace interval.

12. A retrace driven deflection circuit according to claim 11 wherein
  the resonant period of a third resonant circuit comprising the parallel combination of said first and second capacitors and said inductor is selected so as to maintain forward conduction in said rectifier during at least a portion of the trace interval of a deflection cycle.

References Cited

UNITED STATES PATENTS

| | | | |
|---|---|---|---|
| 3,179,843 | 4/1965 | Schwartz | 315—27 |
| 3,195,009 | 7/1965 | Poorter. | |
| 3,229,150 | 1/1966 | Greep et al. | |

JOHN W. CALDWELL, *Primary Examiner.*

R. L. RICHARDSON, *Assistant Examiner.*